United States Patent [19]

Rajaraman

[11] Patent Number: 5,802,310
[45] Date of Patent: Sep. 1, 1998

[54] SYSTEMS AND METHODS FOR DATA CHANNEL QUEUE CONTROL IN A COMMUNICATIONS NETWORK

[75] Inventor: Bala Rajaraman, Raleigh, N.C.

[73] Assignee: International Business Machines Corporation, Armonk, N.Y.

[21] Appl. No.: 655,720

[22] Filed: May 30, 1996

[51] Int. Cl.$^6$ .................................................. G06F 13/38
[52] U.S. Cl. ...................... 395/200.64; 395/200.65; 370/232
[58] Field of Search ...................... 395/200.62, 200.63, 395/200.64, 200.65, 872, 873, 876, 877; 370/231, 232, 236, 229, 235; 711/11

[56] References Cited

U.S. PATENT DOCUMENTS

| | | | |
|---|---|---|---|
| 3,665,416 | 5/1972 | Hikosaka | 395/877 |
| 4,040,027 | 8/1977 | Van Es et al. | 395/877 |
| 4,145,755 | 3/1979 | Suzuki et al. | 395/877 |
| 5,210,829 | 5/1993 | Bitner | 395/200.64 |
| 5,390,299 | 2/1995 | Rege et al. | 395/200.64 |
| 5,412,780 | 5/1995 | Rushton | 395/200.64 |
| 5,506,967 | 4/1996 | Barajas et al. | 395/200.64 |
| 5,566,175 | 10/1996 | Davis | 370/85 |
| 5,604,866 | 2/1997 | Kolb et al. | 395/200.63 |

*Primary Examiner*—Mark H. Rinehart
*Attorney, Agent, or Firm*—Myers Bigel Sibley & Sajovec, P.A.

[57] ABSTRACT

Data transfer from an application at a node of a network to a queue for a data channel is disabled when the amount of queued data in the queue is greater than a first limit and enabled when the amount of queued data in the queue is less than a second limit. The first queue limit preferably is increased when data transfer is disabled and the amount of queued data in the queue is less than the buffer storage capacity and decreased when data transfer is enabled and the data flow rate of the data channel is decreased. The second queue limit preferably is increased when data transfer is enabled and the amount of queued data in the queue is less than a predetermined data channel starvation threshold and decreased if, after data transfer from the application to the queue becomes enabled and an amount of queued data the same as the second queue limit has been communicated from the queue to the data channel, the amount of queued data in the queue is greater than a predetermined threshold. Preferably, the limits include an integral multiple of the predetermined amount of data in a burst, and are increased and decreased by an integral multiple of the predetermined amount of data in a burst. In response to a decrease in the available global storage capacity, the first and second queue limits may be reduced by first and second predetermined amounts, respectively, the first and second predetermined amounts preferably being the same.

30 Claims, 6 Drawing Sheets

SYSTEMS AND METHODS FOR DATA CHANNEL QUEUE CONTROL IN A COMMUNICATIONS NETWORK

FIELD OF THE INVENTION

The present invention relates to communications networks, in particular, to systems and methods for communicating data in communications networks.

BACKGROUND OF THE INVENTION

As the use and complexity of networked computer applications increases, increasing demands are being made upon the data transfer infrastructure of networks, problems which generally are less evident in traditional networks. Traditional centralized networks typically use a centralized architecture in which a central computer, or host, communicates over dedicated communications lines with one or more "dumb" terminals. These terminals typically are incapable of operation independent of the host machine, generally serving merely as data input/output devices for software applications, e.g., computer programs, running on the host. As such, the data transfer demands for these centralized networks generally are modest.

Figure 1:
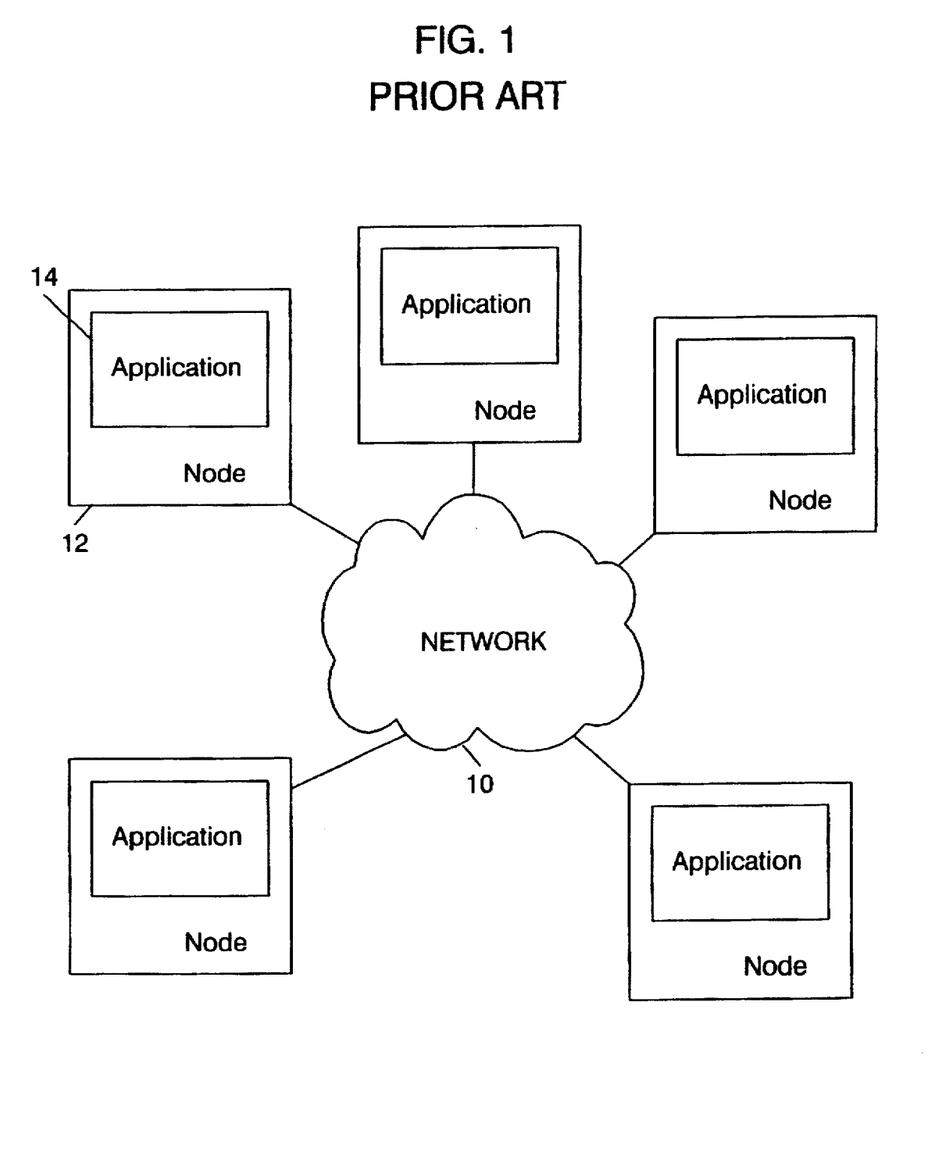
FIG. 1 is a schematic block diagram illustrating a distributed network according to the prior art.

During the information revolution of the past few years, however, network architectures have evolved from this simple centralized architecture to the point where some networks take on a more abstract architecture conceptually illustrated in FIG. 1. The distributed network 10 illustrated in FIG. 1 includes a variety of nodes 12, i.e., computing elements, at which a variety of applications 14 reside. Data is communicated between the applications 14 over the distributed network 10 which, as the illustration suggests, may be an amorphous conglomeration including multiple nodes implemented in computer hardware and software, multiply interconnected using various communications links which in themselves may include special-purpose hardware, computers running software, and the like. For example, the distributed network 10 may include personal and mainframe computers, telephone lines and telephone switching components, data transmission components such as cellular radio communications links and the like, all participating in the communication of data between applications 14. As the infrastructure for traditional services such as telephony and broadcasting is integrated with computer services such as the Internet, networks of the future may also include devices such as computerized telephones, videophones, "set-top boxes," i.e., video gaming and entertainment devices, and devices yet to be conceived.

Figure 2:
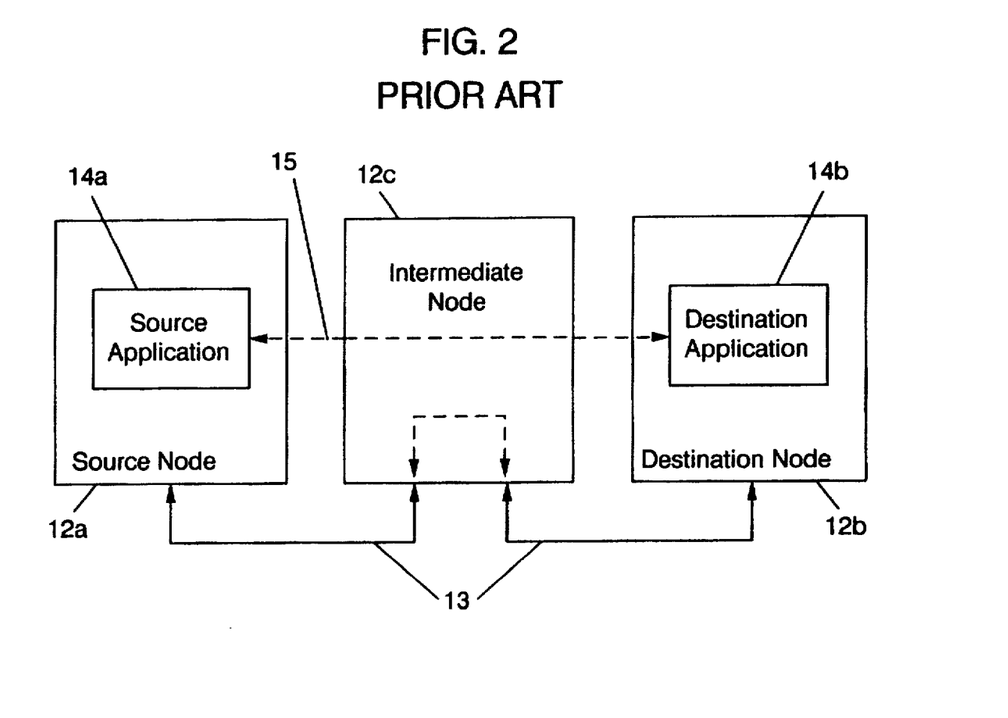
FIG. 2 is a schematic block diagram illustrating data channels in a distributed network according to the prior art.

As illustrated in FIG. 2, in a distributed network 10, in order to effect a data channel 15 to send data from a source application 14a running at a source node 12a to a destination application 14b running at a second node 12b, the physical links 13 for actual transfer of the data typically pass through at least one intermediate node 12c; in fact, data may pass through several intermediate nodes before reaching its destination. For example, in the well-known Internet, data from one network subscriber may be passed through several computers, located on several different computer subnetworks located in different countries on different continents.

Because of the increasing use of such complex data paths, it has become increasingly important to develop data communications protocols which achieve highly reliable transmission of data with a minimum amount of associated overhead. Traditional protocols developed for traditional centralized data networks are generally ill-suited for such a task because these protocols typically engage in elaborate handshaking and data validation and error recovery at each physical link in data stream. Although this overhead may be tolerable in a traditional centralized network in which the majority of data transfers occur over only a few physical links, e.g. a single hop between a central host and a dumb terminal or a two- or three-hop transfer from a terminal to a host via a modem, it is generally undesirable in a modern distributed network that may include a plurality of multiply-interconnected "smart" nodes.

Figure 3:
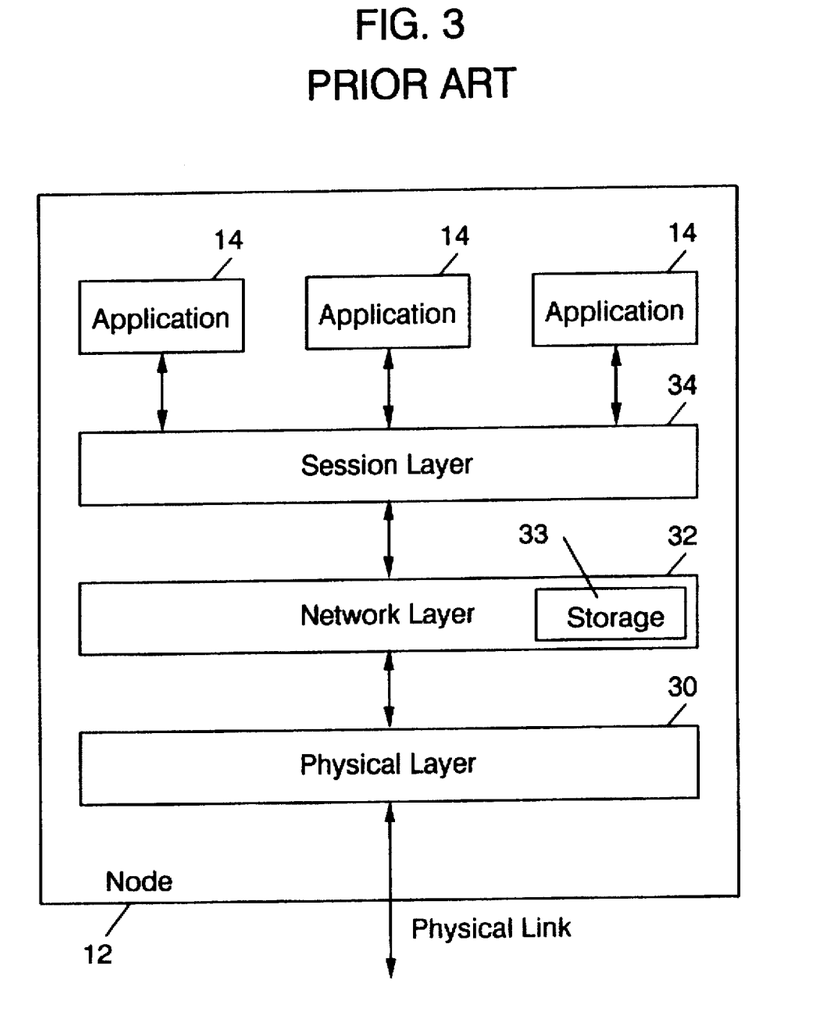
FIG. 3 is a schematic block diagram illustrating an architecture for communication from an application resident at a network node according to the prior art.

For this reason, so called "end-to-end" data transmission schemes have been developed for some distributed networks. As illustrated in FIG. 3, an end-to-end data transmission architecture typically includes multiple "layers" for data transmission to and from applications resident at nodes in the network. In a typical node 12, just above a physical layer 30 which controls the actual computer and communications hardware, resides a network layer 32, e.g., a computer program, which controls data transmission between the node 12 and other nodes in the network. The network layer 32 typically receives data from multiple applications 14 resident at the node 12, and arranges the data into data "packets" for transfer to the network 10, each typically labeled with source and destination identifiers which aid intermediate nodes in determining where the packets are to be routed. The intermediate nodes typically do little or no data validation and error recovery, minimizing the amount of data validation occurring with each physical data transfer and efficiently routing the data packet to its destination. An example of an end-to-end data transfer scheme is the High Performance Routing (HPR) Architecture employed under the Advanced Peer-to-Peer Network (APPN) produced by the assignee of the present invention, as described in *"High Performance Routing Architecture Reference"*, IBM publication number SV40-1018.

In an end-to-end data transmission scheme, data validation and error recovery typically are performed only at the sending and the receiving nodes. Typically, redundancy codes, sequence numbers, or similar information used for data validation is passed between the source and destination nodes, to allow the destination node to verify if all of the data sent from the source node actually reached the destination node. If all or some of the data is lost or corrupted, retransmission may be initiated to supply the missing or corrupted data. By performing this data validation and error recovery on an end-to-end basis, a tremendous improvement in transmission efficiency can be achieved over traditional protocols which perform data validation and recovery over each physical link. Hybrid end-to-end schemes may also be used, with supplemental data validation and recovery occurring over selected physical links which are particularly subject to error.

The network layer 32 typically includes mechanisms for controlling the rate at which data is received from applications 14 and the rate at which data packets are transmitted across the network based on network loading, loading of the destination node, local storage and other conditions. For example, if a large number of users are simultaneously using the network, the network layer 32 may reduce the rate of transmissions to prevent network overloading. As the network layer 32 typically must store data received from the application before reformatting it into packets and sending it on the network, the network layer typically includes associated data storage 33. If the network layer decreases the rate of transmission of data packets, data from applications 14 may begin to fill up the data storage 33.

To deal with this backup of data, information on the status of the network layer 32 may be used by a mediating session layer 34 to control communications between applications 14 and the network layer 32. For example, the network layer 32 may assert a "backpressure" signal to the session layer 30 and, in response, the session layer 30 may forestall acknowledgement of data transfer requests from the application 14, effectively pausing data transfer from the application 14 to the network layer 32.

Figure 4:
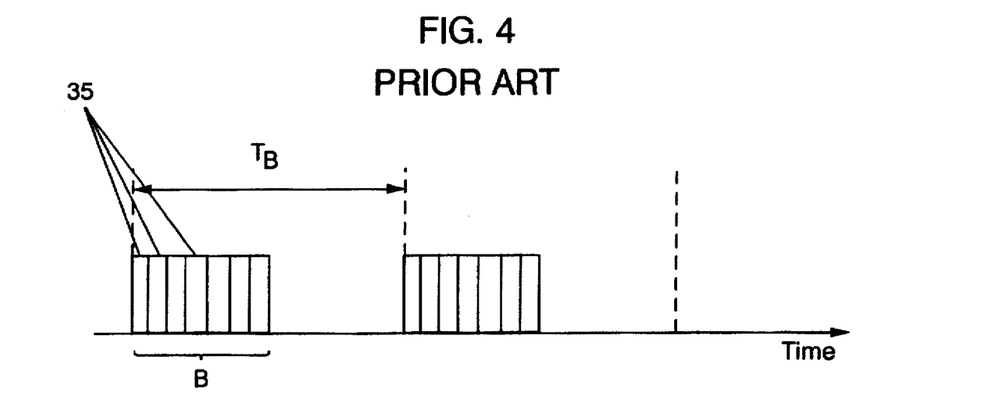
FIG. 4 is a timing diagram illustrating timing for data communications from a network node according to the prior art.

Timing for data packet transfers in a conventional network is illustrated in FIG. 4. Data packets are transmitted over the network in bursts B, each burst B including m data packets, sometimes referred to as Network Layer Packets (NLPs), during a series of burst intervals T. The burst time T and the number m of data packets communicated in a burst B may be controlled to control the data flow rate, i.e., the rate of transfer of NLPs from the node, as for example, in the Adaptive Rate-Based (ARB) control utilized in the HPR system developed by the assignee of the present invention. Under a system such as ARB, the interval between bursts and the number of NLPs in a burst typically are determined based on the data rate required by the application and the maximum throughput that can be supported by the network.

In a backpressure situation, as described earlier, the network layer 32 typically senses a reduction of throughput in the network, and signals the session layer 30 to shut off an application 14 to prevent transfer of data from the application 14 and overflow of the data storage 33. Signalling of a backpressure situation may occur according to various schemes. For example, the backpressure signal may be a simple on/off indication, a signal asserted when the queue is filled and de-asserted once the queue empties. More commonly, a "high-water mark" (HWM) less than the queue capacity and a "low-water mark" (LWM) greater than empty are established for the data storage 33, with a backpressure signal being asserted when the data queued in the data storage 33 exceeds the HWM and de-asserted when the queue drops below the LWM.

Typically, the HWM and the LWM are established in an ad hoc fashion, e.g., a node administrator typically monitors the status of the network and makes an educated guess as to the appropriate HWM and LWM. During the course of operation of the node on the network, the administrator may monitor the network condition to see if network conditions have changed, and may adjust the HWM and the LWM accordingly.

Such an approach generally fails to efficiently use network resources, and may not prevent local storage constraints from causing network instability. Network conditions may change much more rapidly than a network administrator can respond. For example, the amount of global storage available at a node may be suddenly reduced because of the startup of one or more applications at the node. The administrator may be too slow in responding, and even if the administrator does respond, the late response may be counterproductive, increasing network instability or causing starvation of data channels while unnecessarily slowing applications. In addition, because an administrator typically does not constantly monitor the network, the amount of data queued in the network layer may fluctuate in an under-controlled manner, residing at or near the HWM for extended periods while also operating for extended periods at the LWM or below, instead of providing a smooth flow of data. This may represent an inefficient use of data channel capacity.

SUMMARY OF THE INVENTION

In light of the foregoing, it is an object of the present invention to provide systems and methods for communicating data from an application via a data channel which efficiently utilize the data channel capacity.

It is another object of the present invention to provide systems and methods for communicating data from an application via a data channel and an associated queue which dynamically optimize queue parameters such as high water mark (HWM) and low water mark (LWM) in response to network and node conditions.

These and other objects, features and advantages are provided by systems and methods for controlling data transfer from an application to a queue for a data channel which communicates bursts of data from the application on a network, in which transfer from the application to the queue is controlled by comparing the amount of data in the queue to first (upper) and second (lower) queue limits which are dynamically and automatically adapted based on the amount of data in the queue, the data flow rate of the data channel, the buffer storage capacity of the communications buffer which the queue occupies, and the state of the data transfer from the application to the queue. The first limit preferably is increased when data transfer from the application to the queue is disabled and the amount of data in the queue is less than the buffer storage capacity and decreased when data transfer from the application to the queue is enabled and the data flow rate of the data channel is decreased. The second limit preferably is increased if data transfer from the application to the queue is enabled and the amount of data in the queue is less than a predetermined data channel starvation threshold and decreased if, after data transfer from the application to the queue becomes enabled and an amount of queued data the same as the second queue limit has been communicated from the queue to the data channel, the amount of queued data in the queue is greater than a predetermined threshold. The first and second limits preferably correspond to integral multiples of the amount of data in a burst or, if the data channel communicates in packets, the number of packets in a burst. The limits also preferably are increased or decreased by an integral multiple of the amount of data or number of packets in a burst. In addition, the first and second queue limits preferably are decreased by first and second predetermined amounts, respectively, when the available global storage capacity of the global storage occupied by the communications buffer is decreased.

By automatically adapting the first and second queue limits based on storage and data flow conditions, the present invention can provide for efficient utilization of the data channel and queue. Under-controlled, inefficient fluctuations between overload and starvation of the channel can be reduced by maintaining the queue at levels which can provide a steadier flow of data to the channel. Applications may run more quickly, with less obstruction by overly restrictive queue limits, while dynamic and automatic reduction of the queue limits in response to storage shortages and network overloading can prevent overloads which may lead to poor performance, network instability and failure.

In particular, according to the present invention, data transfer from an application resident at a node of a network to a queue for a data channel which communicates data from the node is controlled by application data transfer controlling means for disabling transfer of data from the application to the queue when the amount of queued data in the queue is greater than a first queue limit and enabling transfer of data from the application to the queue when the amount of queued data in the queue is less than a second queue limit. Queue limit determining means determine the first and second queue limits dynamically and automatically based on the amount of queued data queued in the queue, the data flow rate of the data channel, the buffer storage capacity of the communication buffer which the queue occupies, and whether data transfer from the application is enabled.

Preferably, the first queue limit is increased when data transfer from the application to the queue is disabled and the amount of queued data in the queue is less than the buffer storage capacity, and decreased when data transfer from the application to the queue is enabled and the data flow rate of the data channel is decreased. The second queue limit preferably is increased when data transfer from the application to the queue is enabled and the amount of queued data in the queue is less than a predetermined data channel starvation threshold, and preferably is decreased if, after data transfer from the application to the queue becomes enabled and an amount of queued data the same as the second queue limit has been communicated from the queue to the data channel, the amount of queued data in the queue is greater than a predetermined threshold. The first and second queue limits also preferably include an integral multiple of the predetermined amount of data in a burst, and preferably are increased and decreased by an integral multiple of the predetermined amount of data in a burst. The data channel may packetize data from the application into data packets and communicate bursts including a predetermined number of data packets during a successive plurality of burst intervals, with the first and second queue limit each including an integral multiple of the predetermined number of data packets in a burst. The first and second queue limits may be increased and decreased by an integral multiple of the predetermined number of data packets in a burst.

According to another aspect of the present invention, the node may include global storage having an available global storage capacity, with the communications buffer occupying portions of the global storage. In response to a decrease in the available global storage, the first queue limit may be reduced by a first predetermined amount and the second queue limit reduced by a second predetermined amount. Preferably, the second predetermined amount is the same as the first predetermined amount. Systems and methods which efficiently utilize the network and node storage and communications capacity are thereby provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION

Figure 5:
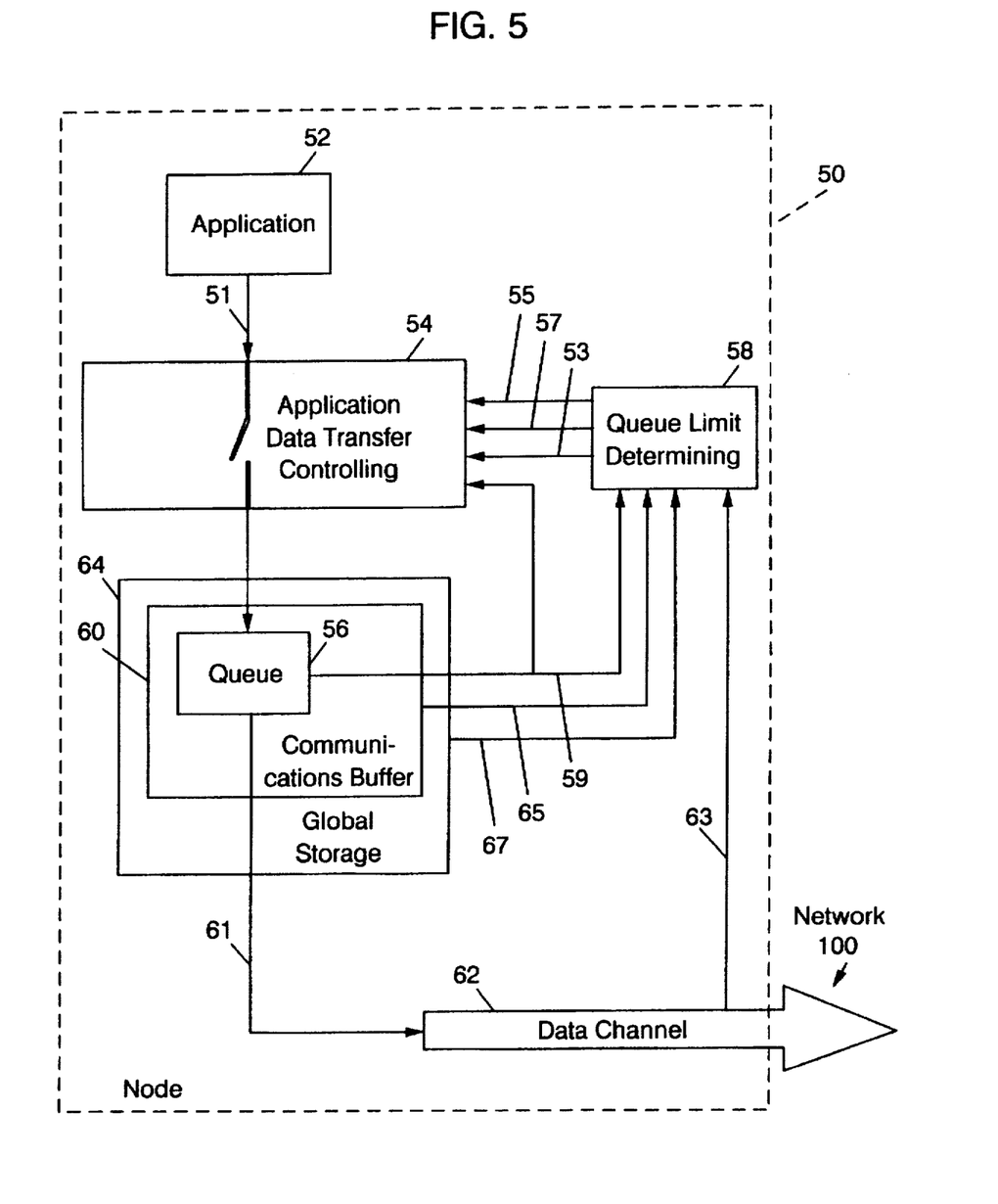
FIG. 5 is a schematic block diagram illustrating a system for controlling data transfer from an application to a data channel queue according to the present invention.

FIG. 5 illustrates node 50 of a network 100 according to the present invention, including an application 52 resident the node 50, which transfers data to a queue 56 for a data channel 62 which communicates data from the node 50 on network 100. The queue 56 is shown occupying portions of a communications buffer 60 having a buffer storage capacity 65, the communications buffer in turn occupying portions of global storage 64 included in the node 50, having an available global storage capacity 67. The transfer of data 51 from the application 52 to the queue 56 is controlled by application data transfer controlling means 54. The application data transfer controlling means 54 controls the transfer of data 51 from the application 52 based on the amount of data 59 queued in the queue 56 and first and second queue limits 55,57 determined by queue limit determining means 58.

Those skilled in the art will understand that the node 50, the application 52, the queue 56, and the data channel 62 may include a variety of software and/or hardware. For example, the node 50 may include a personal, mini, or mainframe computer, running operating system and networking software such as, for example, software included in the session and network layers implemented in the Advanced Peer-to-Peer Network (APPN) of the assignee of the present invention. The application 52 may, for example, include software running in conjunction with the operating system and networking software of the computer, producing data 51. Similarly, the queue 56 may include software operating on a computer which stores data in local storage 60 on the computer for subsequent communication by the data channel 62.

Although the above configuration may be used, those skilled in the art will understand that the node 50, the application 52, the queue 56, the communications buffer 60 and the global storage 64 may include other configurations of hardware and software. For example, the node 50, the global storage 64, the communications buffer 60 and the queue 56 may be "virtual" in the sense that they may be implemented in a distributed fashion using multiple pieces of hardware and/or software. Those skilled in the art will understand that the application 52, the global storage 64, the communications buffer 60, and the queue 56 may include special purpose hardware, software running on general purpose computers, or combinations thereof.

The data channel 62 communicates queued data 61 in bursts including a predetermined amount of data during a plurality of burst intervals. Each burst of data preferably includes a predetermined number of data packets as in, for example, the packet data communication techniques used in the High Performance Routing (HPR) protocol of the APPN architecture. The burst interval length is controlled to produce a data flow rate 63. Those skilled in the art will understand that the data flow rate 63 preferably is determined using information on loading conditions and traffic in the network 100 as in, for, example, the Adaptive Rate-Based (ARB) network flow control utilized in conjunction with HPR. Those skilled in the art will appreciate that the data channel 62 may include various components, for example, modems, telephone lines, radio links, telecommunications switching elements, data compression components, packetizing components, signal processing components and the like, implemented using special purpose hardware, software running on general purpose processors, or combinations thereof.

The application data transfer controlling means 54 controls transfer of data from the application 52 to the queue 56.

The application data transfer controlling means 54 disables data transfer when the amount of queued data 59 in the queue is greater than a first queue limit 55, and enables data transfer when the amount of queued data 59 in the queue is less than a second queue limit 57. Thus, as those skilled in the art will understand, the first and second queue limits 55, 57 implement control of the amount of data 59 in the queue 56 such that hysteresis may be provided in the control of data transfer from the application 52 to the queue 56. In turn, the first and second queue limits 55, 57 are dynamically and automatically determined by queue limit determining means 58, based on the amount of queued data 59, the state 53 of the application data transfer controlling means 54, the buffer storage capacity 65 of the communications buffer 60, and the data flow rate 63 of the data channel 62.

Preferably, the queue limit determining means 58 includes means for increasing the first queue limit 55 when the application data transfer controlling means 54 is in the disabled state and the amount of queued data 59 in the queue 56 is less than the buffer storage capacity 65. Such a condition indicates that the first queue limit 55 is unnecessarily low, preventing the application 52 from transferring data to the queue 56 as quickly as it could, thus unnecessarily impeding the performance of the application 52.

The queue limit determining means 58 also preferably includes means for decreasing the first queue limit 55 when data transfer is enabled and the data flow rate 63 of the data channel 62 is decreased. For example, under a system such as ARB, a decrease in the data flow rate 63 of the data channel 62 may be mandated by an increase in traffic congestion on the network 100. Under such a condition, data will be emptied from the queue 56 at a slower rate, thus causing the queue 56 to fill more quickly. By decreasing the first queue limit 55, data transfer from the application 52 to the queue 56 is disabled at a lower level, reducing the flow of data into the queue 56 to compensate for the reduced flow condition in the data channel 62.

The queue limit determining means 58 preferably includes means for increasing the second queue limit 57 if the data transfer is enabled and the amount of queued data 59 in the queue 56 is less than a predetermined data channel starvation threshold. Starvation of the data channel 62 occurs when insufficient data is queued in the queue 56 to maintain the data flow rate 63 of the data channel 62, representing an inefficient use of the data channel 62. Preferably, the predetermined data channel starvation level corresponds to a queue level at which the insufficient data is being supplied to the data channel 62 to maintain the data flow rate 63 and efficiently use network resources, preferably an amount of data which reflects delays which may be involved in providing data from the application 52 to the queue 56.

The queue limit determining means 58 also preferably includes means for decreasing the second queue limit 57 if, after an amount of queued data the same as the second queue limit 57 has been communicated from the queue 56 to the data channel 62 after data transfer from the application 52 to the queue 56 becomes enabled, the amount of queued data 59 in the queue 56 is greater than a predetermined threshold. Preferably, the data channel 62 communicates a predetermined amount of data in each burst interval at data flow rate. Ideally, the application 52 will replace data in the queue 56 as it is communicated by the data channel 62, to achieve an optimal throughput of data through the queue 56. If, however, after data transfer from the application 52 to the queue 56 becomes enabled and an amount of data the same as the second queue limit 57 has been communicated from the queue 56 over the data channel 62, the amount of queued data 59 in the queue 56 is greater than a predetermined threshold, the application may be filling the queue 57 at an undesirably fast rate and inefficiently using the queue 56. Queue limit determining means 58 may, for example, sample the amount of queued data 59 in the queue 56 after a period of time equal to the time it takes to communicate an amount of data from the queue 56 over the data channel 62 after transfer of data from the application 52 to the queue 56 becomes enabled. If the amount of data queued in the queue 56 at the sampling instant exceeds a predetermined threshold, preferably an integral multiple of the predetermined amount of data in a burst, the queue limit determining means 58 may decrease the second queue limit 57 in order to slow data flow from the application 52 to the queue 56 and thereby achieve a more efficient level in the queue 56.

The queue limiting determining means 58 preferably includes means for reducing the first queue limit 55 by a first predetermined amount when the available global storage 67 of the global storage 64 is decreased, for example, by an increase in the number of applications running at the node 50. Similarly, the queue limit determining means 58 also preferably includes means for reducing the second queue limit 57 by a second predetermined amount when the available global storage capacity 67 is decreased. Preferably, the second predetermined amount is the same as the first predetermined amount, in order to preserve the difference between the first and second queue limits 55, 57. In this manner, the present invention can compensate for global storage shortages which reduce the amount of storage capacity available in the global storage 64 for the communications buffer 60, while maintaining a near-optimal queue level for the data channel 62 by preserving the difference between the first and second queue limits 55, 57.

Those skilled in the art will understand that although the queue limit determining means 58 preferably includes software, for example, software included in such functional units such as the network and session layers of APPN resident at the node 50, the queue limit determining means 58 may include software resident at or distributed among other nodes in the network 100, special purpose hardware included in the node 50 or the network 100, and the like. Those skilled in the art will also understand that the queue limit determining means 58 may be implemented using special purpose hardware, software running on special purpose or general purpose hardware, or combinations thereof.

Figure 6:
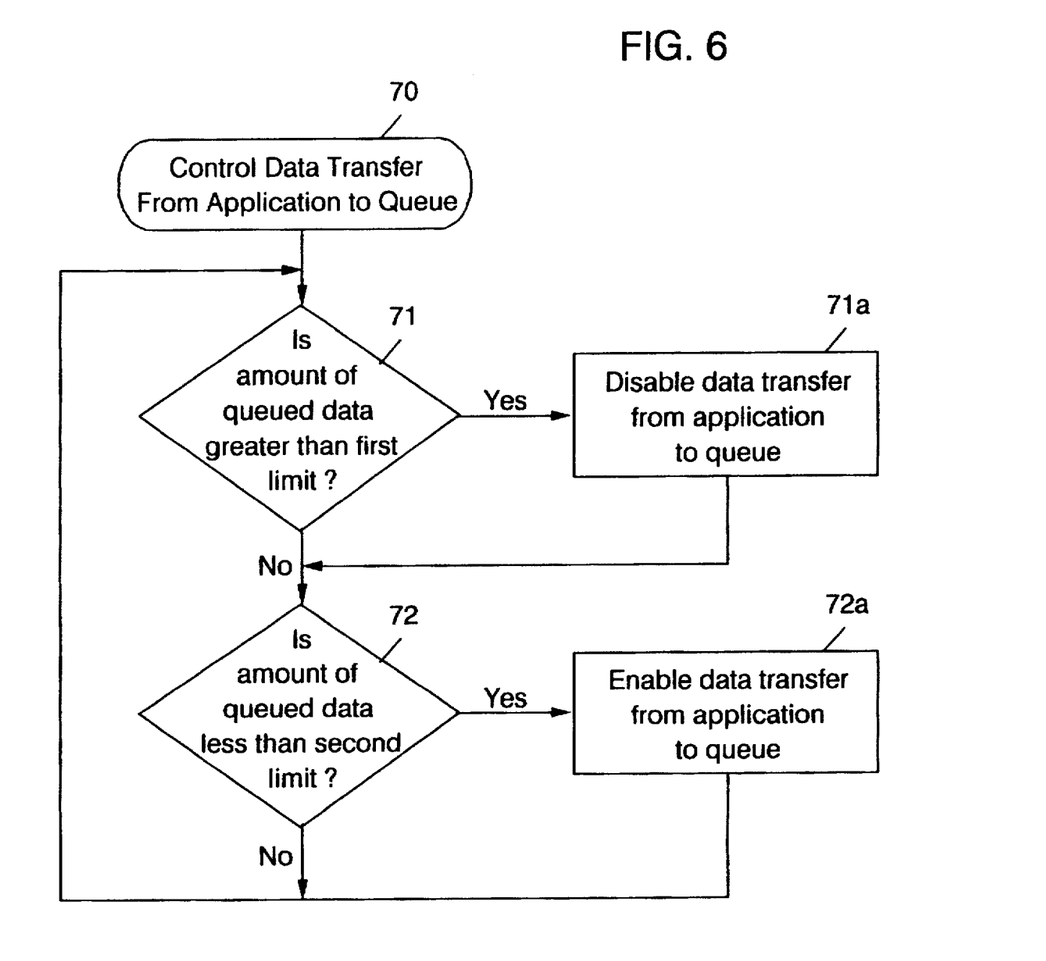
FIG. 6 is a flowchart illustrating operations for controlling data transfer from an application according to the present invention.
Figure 7:
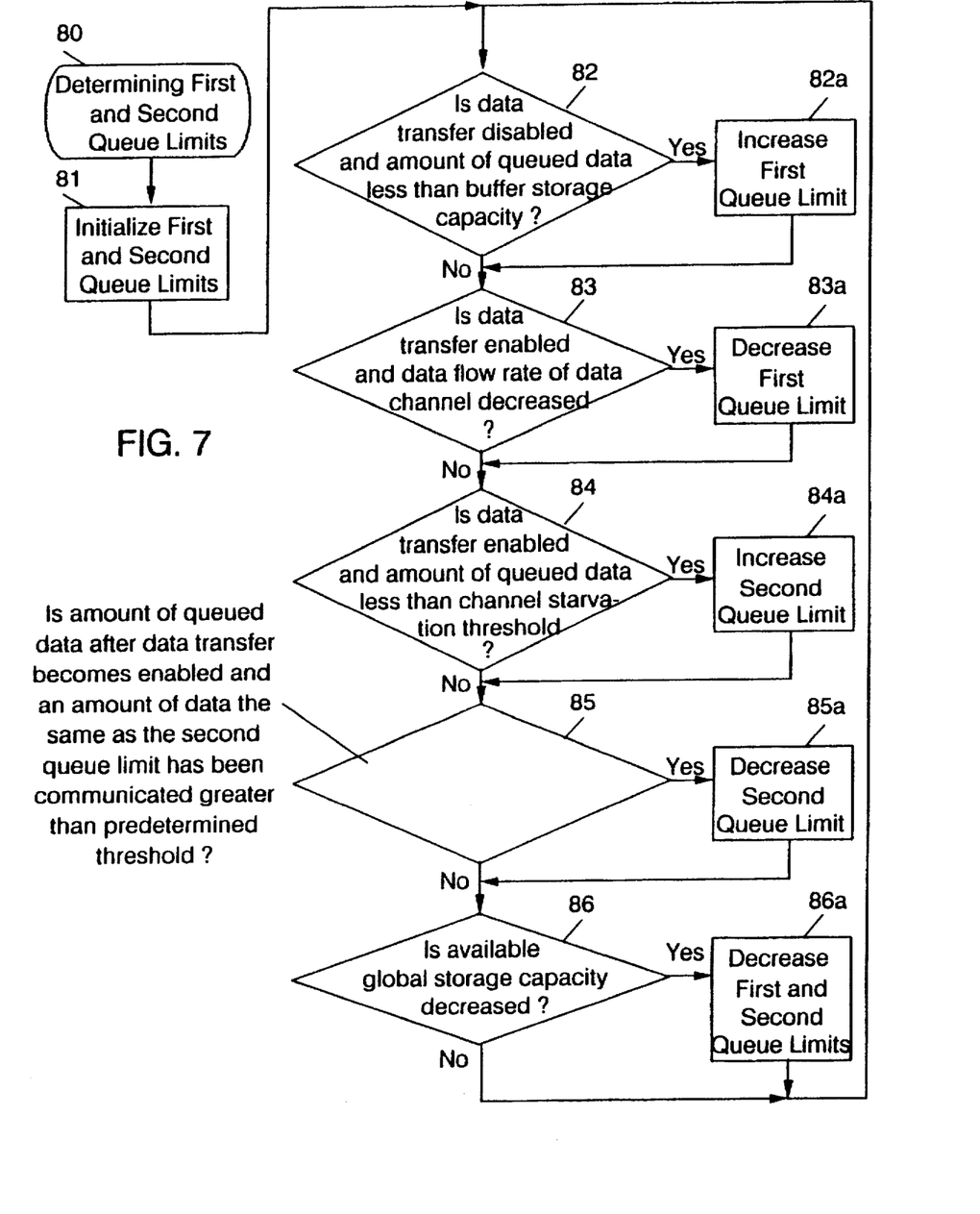
FIG. 7 is a flowchart illustrating operations for determining queue limits according to the present invention.

FIGS. 6 and 7 are flowcharts illustrating methods and systems according to the present invention. It will be understood that each block of these flowchart illustrations, and combinations of blocks in these flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of FIGS. 6 and 7 support combinations of means for performing the specified functions, and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Exemplary operations for control of data transfer from the application 52 to the queue 56 in application data transfer controlling means 54 are illustrated in FIG. 6 (Block 70). If the amount of queued data in the queue is greater than the first queue limit (Block 71), data transfer from the application to the queue is disabled (Block 71a), allowing the queue level to drop. If the amount of data in the queue is less than the second queue limit (Block 72), data transfer from the application to the queue is enabled (Block 72a), allowing the queue to fill. Those skilled in the art will understand that although the operations illustrated in FIG. 6 may be performed in the sequential fashion illustrated, they need not be performed in the illustrated order, or sequentially. For example, the comparisons of the amount of queued data and the queue limits may be performed separately such that the queue level may be simultaneously or concurrently checked or checked in nonuniform sequence wherein the level is compared to one limit more frequently.

Exemplary operations for determining the first and second queue limits 55, 57 in the queue limit determining means 58 are illustrated in FIG. 7 (Block 80). Preferably, the first and second queue limits are initialized to initial values (Block 81). Those skilled in the art will understand that the initial values may correspond, for example, to estimated optimal values based on estimated loading of the network, throughput capabilities of the data channel, throughput requirements of the application, and other factors.

During the course of operation, if data transfer from the application to the queue is disabled and the amount of queued data in the queue is less than the buffer storage capacity (Block 82), representing a suboptimal use of the communications buffer, the first queue limit is increased (Block 82a). Preferably, the queue limit is increased by an integral multiple of the amount of data in a burst or, for a data channel which communicates data packets, an integral multiple of the number of data packets, e.g., Network Layer Packets (NLPs), communicated in a burst interval. If data transfer to the queue is enabled and the data flow of the data channel is decreased (Block 83), for example, through action of an ARB-type flow control, the first queue limit is decreased (Block 83a) to compensate for the reduced data flow rate and prevent overfilling of the queue. The first queue limit preferably is decreased by an integral multiple of the amount of data in a burst or, in a packetized system, an integral multiple of the number of data packets in a burst.

If data transfer from the application and the queue is enabled and the amount of queued data in the queue is less than a channel starvation threshold (Block 84), indicating a inefficient underuse of the data channel, the second queue limit is increased (Block 84a). Preferably, the second queue limit is increased by an integral multiple of the amount of data in a burst or, in a packetized system, an integral multiple of the number of data packets in a burst. If, after data transfer from the application to the queue becomes enabled and an amount of queued data the same as the second queue limit has been communicated from the queue to the data channel, the amount of queued data in the queue is greater than a predetermined threshold (Block 85), representing an inefficient over-queueing of data, the second queue limit is reduced (Block 85a). Preferably, the second queue limit is reduced by an integral multiple of the amount of data in a burst or, in a packetized system, an integral multiple of the number of data packets in a burst.

If the available storage capacity is decreased (Block 86), for example, by the startup of a plurality of applications at the node which reduce the global storage available to the communications buffer, the first and second queue limits preferably are reduced by first and second predetermined amounts, respectively (Block 86a). Those skilled in the art will understand that when the communications buffer shares global storage with other operations, the amount of storage available to the buffer may vary depending on the number of applications operating and their memory demands. For this reason, it is preferable to reduce the first and second queue limits so that the queue operates at a generally lower level to compensate for the loss of capacity. When the global storage shortage is relieved, the first and second queue limits may then increase through the operations outlined above. Preferably, the second predetermined amount is the same as the first predetermined amount, to preserve the difference between the first and second queue limits and maintain a near optimal queue level.

Those skilled in the art will understand that although the operations illustrated in FIG. 7 may be performed in the sequential fashion illustrated, they need not be performed sequentially or in the order illustrated. For example, the operations may be performed separately such that the queue limits may be adjusted concurrently or adjusted in a nonuniform sequence whereby one limit may be adjusted more frequently.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A system for controlling data transfer from an application resident at a node of a network to a queue for a data channel which communicates data from the node, the queue including an amount of queued data and occupying portions of a communications buffer having a buffer storage capacity, the data channel communicating queued data at a data flow rate, the system comprising:

application data transfer controlling means, responsive to the queue, for disabling data transfer from the application and the queue such that data transfer from the application to the queue when the amount of queued data in the queue is greater than a first queue limit and for enabling data transfer from the application to the queue when the amount of queued data in the queue is less than a second queue limit;

queue limit determining means, responsive to the queue and to said application data transfer controlling means, for dynamically and automatically determining said first and second queue limits based upon multiple criteria including at least the amount of queued data queued in the queue, the data flow rate of the data channel, the buffer storage capacity and the state of said application data transfer controlling means.

2. A system for controlling data transfer from an application resident at a node of a network to a queue for a data channel which communicates data from the node, the queue including an amount of queued data and occupying portions of a communications buffer having a buffer storage capacity, the data channel communicating queued data at a data flow rate, wherein the data channel communicates queued data in bursts including a predetermined amount of data during a plurality of burst intervals, the system comprising:

application data transfer controlling means, responsive to the queue, for disabling data transfer from the application and the queue such that data transfer from the application to the queue when the amount of queued data in the queue is greater than a first queue limit and for enabling data transfer from the application to the queue when the amount of queued data in the queue is less than a second queue limit;

queue limit determining means, responsive to the queue and to said application data transfer controlling means, for dynamically and automatically determining said first and second queue limits from the amount of queued data queued in the queue, the data flow rate of the data channel, the buffer storage capacity and the state of said application data transfer controlling means, wherein said queue limit determining means comprises:

means for increasing said first queue limit when data transfer from the application to the queue is disabled and the amount of queued data in the queue is less than the buffer storage capacity;

means for decreasing said first queue limit when data transfer from the application to the queue is enabled and the data flow rate of the data channel is decreased;

means for increasing said second queue limit when data transfer from the application to the queue is enabled and the amount of queued data in the queue is less than a predetermined data channel starvation threshold; and         means for decreasing said second queue limit if, after data transfer from the application to the queue becomes enabled and an amount of queued data the same as said second queue limit has been communicated from the queue to the data channel, the amount of queued data in the queue is greater than a predetermined threshold.

3. A system according to claim 2 wherein said first queue limit and said second queue limit each comprise an integral multiple of the predetermined amount of data in a burst.

4. A system according to claim 3:

wherein said means for increasing said first queue limit comprises means for increasing said first queue limit by an integral multiple of the predetermined amount of data in a burst;

wherein said means for decreasing said first queue limit comprises means for decreasing said first queue limit by an integral multiple of the predetermined amount of data in a burst;

wherein said means for increasing said second queue limit comprises means for increasing said second queue limit by an integral multiple of said predetermined amount of data in a burst; and     wherein said means for decreasing said second queue limit comprises means for decreasing said second queue limit by an integral multiple of said predetermined amount of data in a burst.

5. A system according to claim 4:

wherein said means for increasing said first queue limit comprises means for increasing said first queue limit by the predetermined amount of data in a burst;

wherein said means for decreasing said first queue limit comprises means for decreasing said first queue limit by the predetermined amount of data in a burst;

wherein said means for increasing said second queue limit comprises means for increasing said second queue limit by the predetermined amount of data in a burst; and     wherein said means for decreasing said second queue limit comprises means for decreasing said second queue limit by the predetermined amount of data in a burst.

6. A system according to claim 2 wherein the node includes global storage having an available global storage capacity, wherein the communications buffer occupies portions of the global storage, and further comprising:

means for reducing said first queue limit by a first predetermined amount when the available global storage capacity decreases; and     means for reducing said second queue limit by a second predetermined amount when the available global storage capacity decreases.

7. A system according to claim 6 wherein said second predetermined amount is the same as said first predetermined amount.

8. A system according to claim 2:

wherein the data channel packetizes data from the application into data packets and communicates bursts including a predetermined number of data packets during a successive plurality of burst intervals; and     wherein said first and second queue limit each comprise an integral multiple of the predetermined number of data packets in a burst.

9. A system according to claim 8:

wherein said means for increasing said first queue limit comprises means for increasing said first queue limit by an integral multiple of the predetermined number of data packets in a burst;

wherein said means for decreasing said first queue limit comprises means for decreasing said first queue limit by an integral multiple of the predetermined number of data packets in a burst;

wherein said means for increasing said second queue limit comprises means for increasing said second queue limit by an integral multiple of said predetermined number of data packets in a burst; and     wherein said means for decreasing said second queue limit comprises means for decreasing said second queue limit by an integral multiple of said predetermined number of data packets in a burst.

10. A system according to claim 9:

wherein said means for increasing said first queue limit comprises means for increasing said first queue limit by the predetermined number of data packets in a burst;

wherein said means for decreasing said first queue limit comprises means for decreasing said first queue limit by the predetermined number of data packets in a burst;

wherein said means for increasing said second queue limit comprises means for increasing said second queue limit by the predetermined number of data packets in a burst; and     wherein said means for decreasing said second queue limit comprises means for decreasing said second queue limit by the predetermined number of data packets in a burst.

11. A system for communicating data from an application resident at a node of a network, the node including a communications buffer having a buffer storage capacity, the system comprising:

a queue, occupying portions of the communications buffer, which queues an amount of data from the application;

a data channel which communicates queued data from said queue at a data flow rate;

application data transfer controlling means, responsive to said queue, for disabling data transfer from the application to said queue when the amount of queued data in said queue is greater than a first queue limit and for enabling data transfer from the application to said queue when the amount of queued data in said queue is less than a second queue limit;

queue limit determining means, responsive to said queue and to said application data transfer controlling means, for dynamically and automatically determining said first and second queue limits based upon multiple criteria including at least the amount of queued data queued in said queue, the data flow rate of said data channel, the buffer storage capacity and the state of said application data transfer controlling means.

12. A system for communicating data from an application resident at a node of a network, the node including a communications buffer having a buffer storage capacity, the system comprising:

a queue, occupying portions of the communications buffer, which queues an amount of data from the application;

a data channel which communicates queued data from said queue at a data flow rate;

application data transfer controlling means, responsive to said queue, for disabling data transfer from the application to said queue when the amount of queued data in said queue is greater than a first queue limit and for enabling data transfer from the application to said queue when the amount of queued data in said queue is less than a second queue limit;

queue limit determining means, responsive to said queue and to said application data transfer controlling means, for dynamically and automatically determining said first and second queue limits from the amount of queued data queued in said queue, the data flow rate of said data channel, the buffer storage capacity and the state of said application data transfer controlling means;

wherein said data channel communicates queued data from said queue in bursts during a plurality of burst intervals, each burst including a predetermined amount of data; and wherein said queue limit determining means comprises:

means, responsive to said queue and said application data transfer controlling means, for increasing said first queue limit when data transfer from the application to said queue is disabled and the amount of queued data in said queue is less than the buffer storage capacity;

means, responsive to said queue and said application data transfer controlling means, for decreasing said first queue limit when data transfer from the application to said queue is enabled and the data flow rate of said data channel is decreased;

means, responsive to said queue and said application data transfer controlling means, for increasing said second queue limit when data transfer from the application to said queue is enabled and the amount of queued data in said queue is less than a predetermined data channel starvation threshold; and means, responsive to said queue and said application data transfer controlling means, for decreasing said second queue limit if, after data transfer from the application to said queue becomes enabled and an amount of queued data the same as said second queue limit has been communicated from said queue to said data channel, the amount of queued data in said queue is greater than a predetermined threshold.

13. A system according to claim 12 wherein said first queue limit and said second queue limit each comprise an integral multiple of the predetermined amount of data in a burst.

14. A system according to claim 13:

wherein said means for increasing said first queue limit comprises means for increasing said first queue limit by an integral multiple of the predetermined amount of data in a burst;

wherein said means for decreasing said first queue limit comprises means for decreasing said first queue limit by an integral multiple of the predetermined amount of data in a burst;

wherein said means for increasing said second queue limit comprises means for increasing said second queue limit by an integral multiple of said predetermined amount of data in a burst; and wherein said means for decreasing said second queue limit comprises means for decreasing said second queue limit by an integral multiple of said predetermined amount of data in a burst.

15. A system according to claim 14:

wherein said means for increasing said first queue limit comprises means for increasing said first queue limit by the predetermined amount of data in a burst;

wherein said means for decreasing said first queue limit comprises means for decreasing said first queue limit by the predetermined amount of data in a burst;

wherein said means for increasing said second queue limit comprises means for increasing said second queue limit by the predetermined amount of data in a burst; and wherein said means for decreasing said second queue limit comprises means for decreasing said second queue limit by the predetermined amount of data in a burst.

16. A system according to claim 12 wherein the network includes global storage having an available global storage capacity, wherein the communications buffer occupies portions of the global storage, and further comprising:

means for reducing said first queue limit by a first predetermined amount when the available global storage capacity decreases; and means for reducing said second queue limit by a second predetermined amount when the available global storage capacity decreases.

17. A system according to claim 16 wherein said second predetermined amount is the same as said first predetermined amount.

18. A system according to claim 12:

wherein said data channel packetizes data from the application into data packets and communicates bursts including a predetermined number of data packets during a successive plurality of burst intervals; and wherein said first and second queue limit each comprise an integral multiple of the predetermined number of data packets in a burst.

19. A system according to claim 18:

wherein said means for increasing said first queue limit comprises means for increasing said first queue limit by an integral multiple of the predetermined number of data packets in a burst;

wherein said means for decreasing said first queue limit comprises means for decreasing said first queue limit by an integral multiple of the predetermined number of data packets in a burst;

wherein said means for increasing said second queue limit comprises means for increasing said second queue limit by an integral multiple of said predetermined number of data packets in a burst; and wherein said means for decreasing said second queue limit comprises means for decreasing said second queue limit by an integral multiple of said predetermined number of data packets in a burst.

20. A system according to claim 19:

wherein said means for increasing said first queue limit comprises means for increasing said first queue limit by the predetermined number of data packets in a burst;

wherein said means for decreasing said first queue limit comprises means for decreasing said first queue limit by the predetermined number of data packets in a burst;

wherein said means for increasing said second queue limit comprises means for increasing said second queue limit by the predetermined number of data packets in a burst; and wherein said means for decreasing said second queue limit comprises means for decreasing said second queue limit by the predetermined number of data packets in a burst.

21. A method of controlling data transfer from an application resident at a node of a network to a queue for a data channel which communicates data from the node, the queue including an amount of queued data and occupying portions of a communications buffer having a buffer storage capacity, the data channel communicating queued data at a data flow rate, the method comprising the steps of:

disabling transfer of data from the application to the queue when the amount of queued data in the queue is greater than a first queue limit;

enabling transfer of data from the application to the queue when the amount of queued data in the queue is less than a second queue limit;

dynamically and automatically determining the first and second queue limits based on multiple criteria including at least the amount of queued data queued in the queue, the data flow rate of the data channel, the buffer storage capacity and whether data transfer from the application is enabled.

22. A method of controlling data transfer from an application resident at a node of a network to a queue for a data channel which communicates data from the node, the queue including an amount of queued data and occupying portions of a communications buffer having a buffer storage capacity, the data channel communicating queued data at a data flow rate, wherein the data channel communicates queued data in bursts including a predetermined amount of data during a plurality of burst intervals, the method comprising the steps of:

disabling transfer of data from the application to the queue when the amount of queued data in the queue is greater than a first queue limit;

enabling transfer of data from the application to the queue when the amount of queued data in the queue is less than a second queue limit; and dynamically and automatically determining the first and second queue limits based on the amount of queued data queued in the queue, the data flow rate of the data channel, the buffer storage capacity and whether data transfer from the application is enabled;

wherein said step of determining the first and second queue limits comprises the steps of:

increasing the first queue limit when data transfer from the application to the queue is disabled and the amount of queued data in the queue is less than the buffer storage capacity;

decreasing the first queue limit when data transfer from the application to the queue is enabled and the data flow rate of the data channel is decreased;

increasing the second queue limit when data transfer from the application to the queue is enabled and the amount of queued data in the queue is less than a predetermined data channel starvation threshold; and decreasing the second queue limit if, after data transfer from the application to the queue becomes enabled and an amount of queued data the same as the second queue limit has been communicated from the queue to the data channel, the amount of queued data in the queue is greater than a predetermined threshold.

23. A method according to claim 22 wherein the first queue limit and the second queue limit each comprise an integral multiple of the predetermined amount of data in a burst.

24. A method according to claim 23:

wherein said step of increasing the first queue limit comprises the step of increasing the first queue limit by an integral multiple of the predetermined amount of data in a burst;

wherein said step of decreasing the first queue limit comprises the step of decreasing the first queue limit by an integral multiple of the predetermined amount of data in a burst;

wherein said step of increasing the second queue limit comprises the step of increasing the second queue limit by an integral multiple of the predetermined amount of data in a burst; and wherein said step of decreasing the second queue limit comprises the step of decreasing the second queue limit by an integral multiple of the predetermined amount of data in a burst.

25. A method according to claim 24:

wherein said step of increasing the first queue limit comprises the step of increasing the first queue limit by the predetermined amount of data in a burst;

wherein said step of decreasing the first queue limit comprises the step of decreasing the first queue limit by the predetermined amount of data in a burst;

wherein said step of increasing the second queue limit comprises the step of increasing the second queue limit by the predetermined amount of data in a burst; and wherein said step of decreasing the second queue limit comprises the step of decreasing the second queue limit by the predetermined amount of data in a burst.

26. A method according to claim 22 wherein the node includes global storage having an available global storage capacity, wherein the communications buffer occupies portions of the global storage, and further comprising the steps of:

reducing the first queue limit by a first predetermined amount when the available global storage capacity decreases; and reducing the second queue limit by a second predetermined amount when the available global storage capacity decreases.

27. A method according to claim 26 wherein the second predetermined amount is the same as the first predetermined amount.

28. A method according to claim 22 wherein the data channel packetizes data from the application into data packets and communicates bursts including a predetermined number of data packets during a successive plurality of burst intervals, and wherein the first and second queue limit each comprise an integral multiple of the predetermined number of data packets in a burst.

29. A method according to claim 28:

wherein said step of increasing the first queue limit comprises the step of increasing the first queue limit by an integral multiple of the predetermined number of data packets in a burst;

wherein said step of decreasing the first queue limit comprises the step of decreasing the first queue limit by an integral multiple of the predetermined number of data packets in a burst;

wherein said step of increasing the second queue limit comprises the step of increasing the second queue limit by an integral multiple of the predetermined number of data packets in a burst; and wherein said step of decreasing the second queue limit comprises the step of decreasing the second queue limit by an integral multiple of the predetermined number of data packets in a burst.

30. A method according to claim 29:

wherein said step of increasing the first queue limit comprises the step of increasing the first queue limit by the predetermined number of data packets in a burst;

wherein said step of decreasing the first queue limit comprises the step of decreasing the first queue limit by the predetermined number of data packets in a burst;

wherein said step of increasing the second queue limit comprises the step of increasing the second queue limit by the predetermined number of data packets in a burst; and wherein said step of decreasing the second queue limit comprises the step of decreasing the second queue limit by the predetermined number of data packets in a burst.

* * * * *